United States Patent
Huang et al.

(10) Patent No.: US 10,736,178 B2
(45) Date of Patent: *Aug. 4, 2020

(54) CONNECTION METHOD FOR WIRELESS SYSTEM

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 140 days.

This patent is subject to a terminal disclaimer.

(21) Appl. No.: 15/880,203

(22) Filed: Jan. 25, 2018

(65) Prior Publication Data

US 2019/0098696 A1   Mar. 28, 2019

(30) Foreign Application Priority Data

Sep. 27, 2017 (TW) .............................. 106133186 A

(51) Int. Cl.
*H04W 88/04* (2009.01)
*G06F 11/32* (2006.01)
(Continued)

(52) U.S. Cl.
CPC .......... *H04W 88/04* (2013.01); *G06F 11/327* (2013.01); *H04W 4/30* (2018.02); *H04W 76/18* (2018.02);
(Continued)

(58) Field of Classification Search
CPC ....... H04W 88/04; H04W 76/18; H04W 4/30; G06F 11/327; H04B 7/155
(Continued)

(56) References Cited

U.S. PATENT DOCUMENTS 6,104,717 A   8/2000   Coile et al.
7,889,717 B2  2/2011   Schneider et al.
(Continued)

FOREIGN PATENT DOCUMENTS

EP   2731304 B1   6/2017
JP   4339234 B2   10/2009
(Continued)

OTHER PUBLICATIONS

English Abstract for JP4339234, Total of 1 page.
English Abstract for JP2010124431, Total of 1 page.

*Primary Examiner* — Christopher R Crompton
(74) *Attorney, Agent, or Firm* — R. Lynette Wylie; Apex Juris, pllc.

(57) ABSTRACT

A connection method for a wireless system, wherein the wireless system includes an access point, an electronic device, a relay device and an appliance; the electronic device and the relay device are connected to the access point, respectively; the relay device is connected to the appliance via signals; the relay device is adapted to send control commands to the appliance; the connection method includes the following steps: sending a connection request command to a default IP address from the electronic device through the access point for at least one time; determining whether a connection-successful information is received from the default IP address or not. Then, establishing a connection between the electronic device and the relay device, or sending at least one connection request command to at least one different IP address in the same local area network from the electronic device.

6 Claims, 2 Drawing Sheets

(51) Int. Cl.
*H04W 76/18* (2018.01)
*H04W 4/30* (2018.01)
*H04B 7/155* (2006.01)
*H04B 7/26* (2006.01)
*H04L 29/12* (2006.01)

(52) U.S. Cl.
CPC ............ *H04B 7/155* (2013.01); *H04B 7/2606* (2013.01); *H04L 61/2007* (2013.01)

(58) Field of Classification Search
USPC .......................................................... 370/315
See application file for complete search history.

(56) References Cited

U.S. PATENT DOCUMENTS

| | | | |
|---|---|---|---|
| 8,532,126 B2 | 9/2013 | Asnis et al. | |
| 2002/0051459 A1* | 5/2002 | Denecheau | H04L 29/12009 370/409 |
| 2004/0111469 A1 | 6/2004 | Manion et al. | |
| 2006/0095585 A1* | 5/2006 | Meijs | H04L 29/12132 709/245 |
| 2009/0323635 A1* | 12/2009 | Gras | H04W 36/0011 370/331 |
| 2010/0246478 A1* | 9/2010 | Liu | H04L 1/1887 370/315 |
| 2014/0029570 A1* | 1/2014 | Lee | H04W 36/0005 370/331 |
| 2015/0156266 A1 | 6/2015 | Gupta | |
| 2018/0092085 A1* | 3/2018 | Shaheen | H04W 28/08 |
| 2018/0167983 A1* | 6/2018 | Salkintzis | H04W 8/22 |
| 2019/0052603 A1* | 2/2019 | Wu | H04W 12/06 |
| 2019/0190885 A1* | 6/2019 | Krug | H04L 61/2517 |
| 2019/0230723 A1* | 7/2019 | Kim | H04W 68/02 |

FOREIGN PATENT DOCUMENTS

| | | | | |
|---|---|---|---|---|
| JP | 2010124431 A | 6/2010 | | |
| WO | WO 2011/108708 | * | 9/2011 | ....... H04L 29/12047 |

* cited by examiner

CONNECTION METHOD FOR WIRELESS SYSTEM

BACKGROUND OF THE INVENTION

1. Technical Field

The present invention is related to a wireless system, and more particularly related to a connection method for a wireless system.

2. Description of Related Art

A remote control to operate a home appliance wirelessly from a short distance is a common device in present households. Typically, one remote control is matched with one home appliance in a one-to-one relation, which means that each home appliance has a specific remote control to control it. Therefore, with more home appliances in a home, there are more remote controls to track. Furthermore, home appliances having the same type of applications usually have similar looking remote controls, which may confuse the user.

In light of this, a remote control system having a relay device that could be connected to an access point, which allows the user to access the relay device with an electronic device such as a computer or a mobile phone through the access point. Within such a remote control system, the user could input a command on an electronic device, and this command would then be transmitted to the relay device. Upon receiving the command, the relay device would convert it into a control signal, and transmit the control signal to a specific home appliance. In this way, the user is able to control various home appliances with a single electronic device as a remote control.

When the relay device is connected to the access point, the access point would assign an IP address to the relay device. After being set up, the electronic device is communicated with the relay device via the IP address so as to send control commands to the relay device. However, when a connection between the relay device and the access point is interrupted and then established again, the IP address received from the access point may be different. Therefore, the electronic device would be unable to be connected to the relay device via the IP address set up originally, thereby losing communication with the relay device.

BRIEF SUMMARY OF THE INVENTION

In view of the above, the purpose of the present invention is to provide a connection method for a wireless system which could reduce the possibility that the electronic device could not be connected to the relay device.

To achieve the object mentioned above, the present invention provides a connection method for a wireless system, wherein the wireless system includes an access point, an electronic device, a relay device and at least one appliance; the electronic device and the relay device are connected to the access point, respectively; the relay device is connected to the appliance via signals; the relay device is adapted to send control commands to the appliance; the connection method for the wireless system comprises the following steps: A. sending a connection request command to a default IP address from the electronic device through the access point for at least one time; B. determining whether a connection-successful information is received from the default IP address or not by the electronic device: if a connection-successful information is received from the default IP address, establishing a connection between the electronic device and the relay device; if a connection-successful information is not received from the default IP address, sending at least one connection request command to at least one different IP address in the same local area network from the electronic device through the access point; establishing the connection between the electronic device and the relay device when the connection-successful information is received from the at least one IP address.

The advantage of the present invention is that the connection between the electronic device and the relay device could be established as long as the relay device is connected to the access point, even though the electronic device does not recognize the IP address of the relay device before connection thereby reducing the possibility that the electronic device could not be connected to the relay device.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
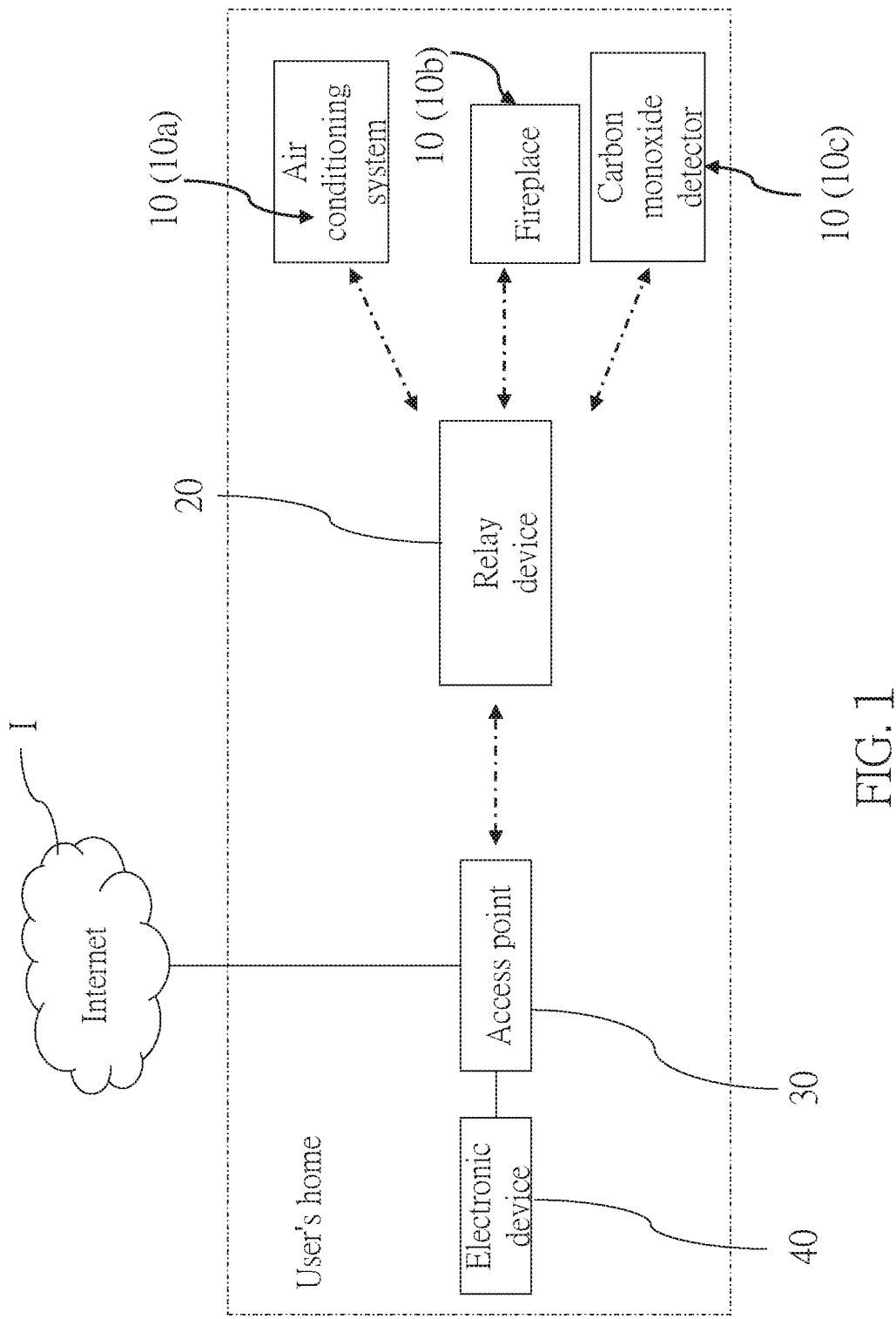
FIG. 1 is a schematic block diagram of a wireless system of an embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1, a wireless system of an embodiment according to the present invention includes at least one appliance 10, a relay device 20, an access point 30 and an electronic device 40.

In this embodiment, the wireless system includes a plurality of appliances 10 which are located at a user's home, wherein the appliances 10 include two controllable appliances and one detection appliance. In this embodiment, the controllable appliances are an air conditioning system 10a and a fireplace 10b as an example, and the detection appliance is a carbon monoxide detector 10c as an example. Each of the appliances 10 is wirelessly connected to the relay device 20 via a radio frequency signal (i.e., RF signal). However, the wireless connection with RF signals is not a limitation of the present invention. Other wireless signals such as Wi-Fi, Zigbee, Bluetooth, infrared ray, etc., also could be utilized. The controllable appliances are configured to receive a control command and perform an action corresponding to the control command (e.g., power on/off, adjusting temperature, etc.). A state information of each of the controllable appliances is compiled into an RF signal to be transmitted, wherein the state information may include a status of being on/off, a current temperature, an error code, etc. Also, a state information of the detection appliance is compiled into an RF signal to be transmitted, wherein the state information may include a physical quantity measured by the detection appliance (e.g., concentration of carbon monoxide).

The relay device 20 is located at the user's home and is wirelessly connected to the access point 30 via a Wi-Fi signal so as to be connected to a local area network of the user's home, and could be further connected to an internet I via the access point 30. The relay device 20 is adapted to receive an RF/Wi-Fi signal, and convert the received RF/Wi-Fi signal into a corresponding Wi-Fi/RF signal to be sent out. Also, the relay device 20 is adapted to receive the RF signal including the state information from the appliances 10, and to interpret the received RF signal to obtain the corresponding state information, and the corresponding state information is stored into a memory (not shown). When the relay device 20 is connected to the access point 30, the access point 30 would assign an IP address to the relay device 20.

In this embodiment, the electronic device 40 is a tablet as an example, which could be connected to the access point 30 or connected to the access point 30 through the Internet I. The electronic device 40 has a built-in application, which is adapted for the user to input control commands (e.g., power on/off, adjusting temperature, etc.) of the appliances 10. The user could utilize the application of the electronic device 40 to designate at least one of the appliances 10 which is to be controlled. When the electronic device 40 is connected to the Internet I directly, one or a plurality of control commands inputted by the user could be sent to the access point 30 by the electronic device 40 through the Internet I and then be transmitted to the relay device 20, wherein said one or plurality of control commands include an IP address and an identification code of the relay device 20, a device code corresponding to the at least one appliance 10, and command codes (e.g., the corresponding command codes for powering on or off, adjusting temperature, and other operations), whereby to designate the relay device 20 or the appliance 10 which is to be controlled. A default IP address is recorded in the electronic device 40 which could be adapted to be connected to the relay device 20. The default IP address could be a fixed IP address or the IP address of the relay device 20 which is used in a previous connection.

Figure 2:
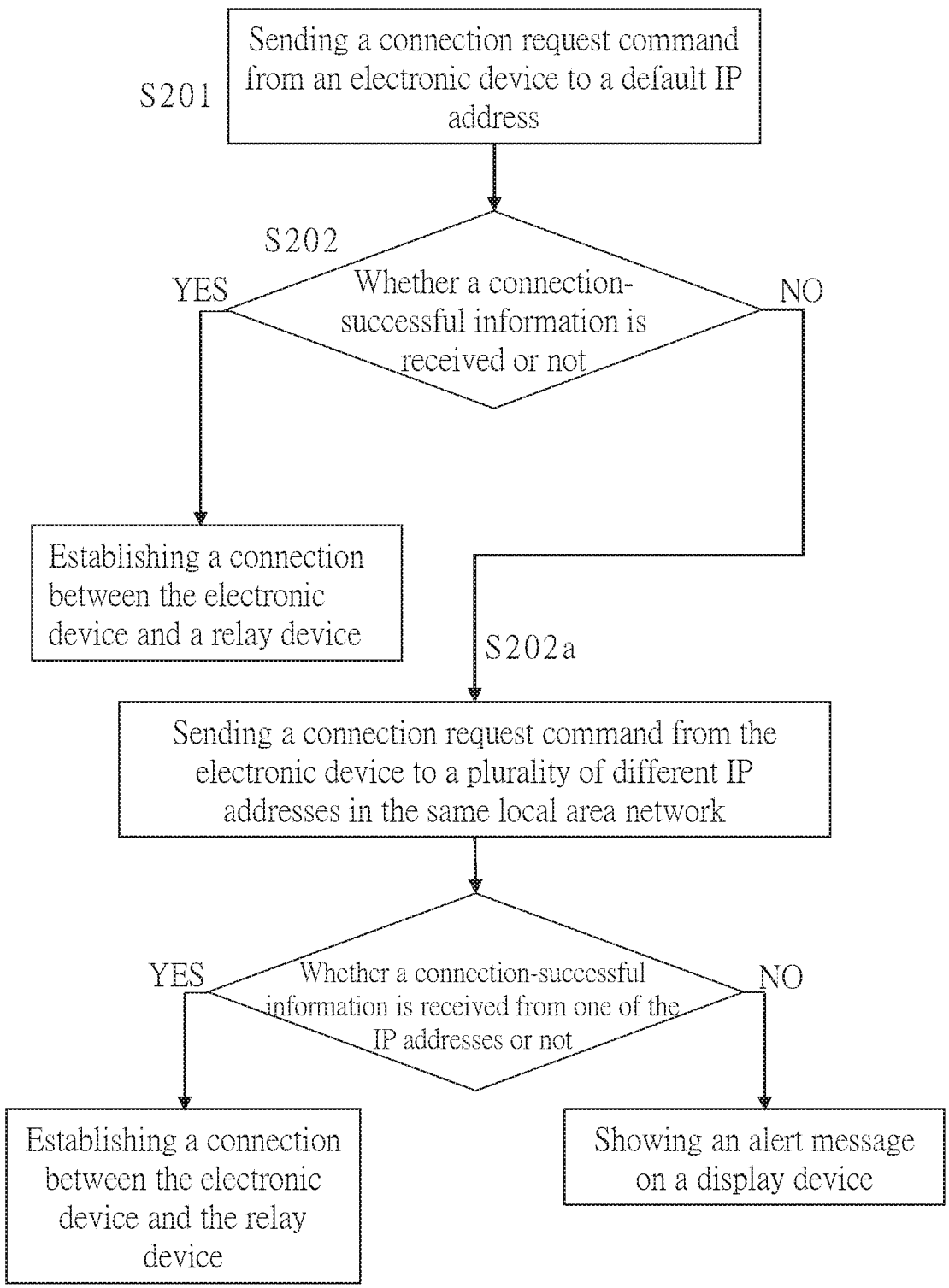
FIG. 2 is a flowchart of a connection method for the wireless system of the embodiment according to the present invention.

With the aforementioned configuration, the connection method for the wireless system of the embodiment of the present invention could be applied, wherein the method includes the following steps, as shown in FIG. 2.

In step S201, the user controls the application of the electronic device 40 to connect to the access point 30, and the electronic device 40 sends a connection request command to the default IP address through the access point 30 for at least one time.

In step S202, the electronic device 40 would determine whether a connection-successful information is received from the default IP address or not.

When the electronic device 40 receives the connection-successful information from the default IP address, it means that the relay device 20 has confirmed the reception of the connection request command, and the connection between the electronic device 40 and the relay device 20 has been established. Whereby, the electronic device 40 could send control commands to the relay device 20, and the relay device 20 could also send the state information back to the electronic device 40.

If the electronic device 40 does not receive the connection-successful information after a period of time, it means that the IP address of the relay device 20 is different from the default IP address or the relay device 20 is not connected to the access point 30, then step S202a would be executed.

In step S202a, the electronic device 40 sends a plurality of connection request commands to a plurality of different IP addresses in the same local area network through the access point 30.

Then, the electronic device 40 would determine whether the connection-successful information is received from any one of the plurality of IP addresses or not.

When the connection-successful information is received from any one of the plurality of IP addresses, the connection between the electronic device 40 and the relay device 20 is established.

If the connection-successful information is not received, the application would show an alert message on a display device (not shown) of the electronic device 40 to alert that the relay device 20 is not connected to the electronic device 40.

In this embodiment, the electronic device 40 sends the connection request commands to the IP addresses in the same local area network according to a default order through the access point 30, respectively. The IP address of the relay device 20, the default IP address and the IP addresses in the same local area network apply an IPv4 protocol which consists of four octets (e.g., 192.168.0.X, wherein X is an integer between 0 and 255), wherein first three octets of the IP addresses and first three octets of the default IP address are the same, while the last octets of the IP addresses and the default IP address are different. Therefore, the electronic device 40 sends the connection request commands to the IP addresses whose last octet is between 0 and 255 so as to determine whether the connection-successful information is received from any one of the IP addresses or not. When the connection-successful information is received from any one of the IP addresses, the electronic device 40 would stop sending the connection request commands which are not sent yet.

The aforementioned default order could be an increment number starting from 0 or a decrement number starting from 255. In this embodiment, the default order increments or decrements based on the last octet of the default IP address so as to increase the scanning speed of the IP addresses. For example, when the default IP address includes the last octet of N, the electronic device 40 would send the connection request commands to the IP addresses whose last octet is between N−p and N+q, wherein p is an integer between 1 and 20, and q is an integer between 1 and 20. The sending order for the IP addresses could increment from the last octet of N−p to the last octet of N+q or decrement from the last octet of N+q to the last octet of N−p, alternatively. If the connection-successful information is not received from the IP addresses whose last octet is between N−p and N+q, the electronic device 40 would continue to send the connection request commands to other IP addresses.

In addition to the aforementioned method for scanning IP addresses, a method of an alternative embodiment, which is based on the method of the above embodiment, further includes a step of storing a default IP address in the electronic device 40 in step S201, wherein the default IP address is adapted for connecting to the relay device 20. The relay device 20 could send the default IP address or an IP address other than the default IP address to the access point 30, wherein a difference between the IP address and the default IP address is at least equal to or multiple times of an integer, and request the access point 30 to assign the sent IP address to the relay device 20. For example, when the default IP address is 192.168.0.100, and the integer is 5, the access point 30 would connect to the relay device 20 via the default IP address first. If the default IP address is occupied by other devices, the relay device 20 would continue to send an IP address which has a difference of at least equal to the integer (e.g., 192.168.0.105) to the access point 30. If the IP address is still occupied by other devices, the relay device 20 would send the IP address again which has a difference of double of the integer (192.168.0.110), and so on. In step S202, if the connection-successful information is not received, the electronic device 40 would send at least one connection request command to at least one different IP address in the same local area network through the access point 30, wherein a difference between the at least one IP address and the default IP address is at least equal to or multiple times of the integer (e.g., the at least one IP address is 192.168.0.105, 192.168.0.110, 192.168.0.115, and so on). When the connection-successful information is received from the at least one IP address, the connection between the electronic device 40 and the relay device 20 is established.

According to the illustration mentioned above, the connection method for the wireless system of the present invention, through sending a plurality of connection request commands to a plurality of IP addresses in the same local area network from the electronic device 40, the connection between the electronic device 40 and the relay device 20 could be established as long as the relay device 20 is connected to the access point 30, even though the electronic device 40 does not recognize the IP address of the relay device 20 before connection, whereby reducing the possibility that the electronic device 40 could not be connected to the relay device 20 and improving the convenience of the connection.

It must be pointed out that the embodiments described above are only some embodiments of the present invention. All equivalent structures which employ the concepts disclosed in this specification and the appended claims should fall within the scope of the present invention.

What is claimed is:

1. A connection method for a wireless system, wherein the wireless system includes an access point, an electronic device, a relay device and at least one appliance;
    the electronic device and the relay device are connected to the access point, respectively; the relay device is connected to the appliance via signals; the relay device is adapted to send control commands to the appliance; the connection method for the wireless system comprises the following steps:
    A. sending a connection request command to a default IP address from the electronic device through the access point for at least one time;
    B. determining a connection-successful information establishing a connection between the electronic device and the relay device is not received from the default IP address by the electronic device, and sending at least one connection request command to at least one different IP address in the same local area network from the electronic device through the access point; and
    C. establishing the connection between the electronic device whereby the relay device sends control commands to the appliance after the connection-successful information is received from the at least one IP address.

2. The connection method of claim 1, wherein step B further comprises steps of:
    sending a plurality of connection request commands from the electronic device to a plurality of IP addresses in the same local area network according to a default order through the access point when the connection-successful information is not received; and
    stopping sending the connection request commands which are not sent yet from the electronic device, when the connection-successful information is received from any one of the plurality of IP addresses.

3. The connection method of claim 2, wherein the default IP address consists of four octets; in step B, the plurality of IP addresses where the electronic device sends the connection request commands to consist of four octets respectively, wherein first three octets of the IP addresses and first three octets of the default IP address are the same, while the last octets of the IP addresses and the default IP address are between 0 and 255.

4. The connection method of claim 3, wherein the default IP address includes last one of the four octets of N; in step B, the connection request commands are sent to the IP addresses whose last octet is between N−p and N+q first, wherein p is an integer between 1 and 20, and q is an integer between 1 and 20; if the connection-successful information is not received from the IP addresses whose last octet is between N−p and N+q, the connection request commands are continued to be sent to other IP addresses.

5. The connection method of claim 2, wherein step B further comprises showing an alert message on a display device of the electronic device to alert that the relay device is not connected to the electronic device when the connection-successful information is not received from any one of the plurality of IP addresses.

6. The connection method of claim 1, wherein step A further comprises storing the default IP address in the relay device, and sending the default IP address or an IP address other than the default IP address to the access point by the relay device, wherein a difference between the IP address and the default IP address is at least equal to or multiple times of an integer, and requesting the access point to assign the sent IP address to the relay device; a difference between the at least one IP address in step B and the default IP address is at least equal to or multiple times of the integer.

* * * * *